United States Patent Office 3,423,560
Patented Jan. 21, 1969

3,423,560
STORED ENERGY ELECTRIC STUD
WELDING APPARATUS
Ronald F. Brennen, Pompano Beach, Fla., assignor to Uniweld Products, Inc., Fort Lauderdale, Fla., a corporation of Delaware
Continuation-in-part of application Ser. No. 529,487, Feb. 23, 1966. This application Apr. 22, 1966, Ser. No. 544,544
U.S. Cl. 219—98          18 Claims
Int. Cl. B23k 9/10, 11/04

This application is a continuation-in-part of my copending application Ser. No. 529,487, filed on Feb. 23, 1966 entitled Stored Energy Electric Stud Welding Apparatus.

This invention relates to lightweight, portable patentably novel electric welding apparatus adapted to be used in those countries of the world, particularly in various European countries where the standard, or available, voltages are many and varied. Said apparatus is commonly referred to as stud welding apparatus and includes capacitor discharge means, such as a storage capacitor, operable in such a manner that the discharge of said capacitor discharge means is effectively slowed down without any unnecessary heat energy dissipation, thereby preventing improper melting of the stud to be welded to its base and also thereby preventing unnecessary burning of said base with the result of a clean and permanent joining of the stud to its base. As in the apparatus of my aforestated copending application, in the patentably novel apparatus of this invention there is attained a drawn arc between the stud and its base and the heat energy is not unnecessarily dissipated during the joining of the stud to its base.

Likewise, the patentably novel stud welding apparatus of this invention is utilized in building construction, or the like, to fasten small cross-section elongated elements such as threaded studs to sheet metal surfaces such as heating and air conditioning ducts to enable insulating material or the like to be affixed thereto.

Also, the patentably novel electric stud welding apparatus of this invention is primarily utilized in building construction and is easily portable and particularly relatively small in size and light in weight. As hereinbefore set forth, this patentably novel electric stud welding apparatus is used in many parts of the world where the standard or available voltage of electric power sources are many and varied and is likewise used on location and at long distances from commercial power lines, and is powered by either portable generating equipment or long extension cords and is such that its input power requirements may be readily changed to correspond to the available electric power source and are maintained to the minimum peak values that can be reasonably obtained consistent with the output energy levels and with the necessarily intermittent usage thereof for the purpose of keeping the fluctuations of the input power required to a minimum. Therefore, the high energy demands of the apparatus are reflected only minimally at the input to the welding apparatus, while the high energy levels thereof are applied to the weld joint for short time periods.

The patentably novel electric stud welding apparatus of this invention is such that the output energy applied to the weld is reliably consistent and that the time interval during which the welding energy is applied is of the correct duration. With the electric stud welding apparatus of this invention likewise, the welding duration is not too short, the temperature of the weld does not become excessively high and the areas surrounding the weld do not remain cold, with the result that there is not too rapid cooling, or quenching, of the weld joint, and there is not caused any excessive crystallization at the weld joint, or voids in the weld joint, with the result that strong and ductile weld joints are produced. In joining the stud to the base with the apparatus herein, the stud is at the start in contact with the base and a pilot current is passed between said stud and base. Then said stud is separated for a small distance from said base and a pilot arc is drawn forming an ionized path therebetween. An arc for fusing said base and stud then passes along said ionized path, and said stud is then returned to be in contact with said base.

Likewise, with the patentably novel electric stud welding apparatus of this invention two conductive elements are joined, or welded, to each other, one of said elements being a stud, by initiating a low power pilot arc between the stud and a conductive surface while at close proximity forming an ionized path therebetween and then separating said stud from the surface a short distance concurrently with the application of full welding power along the ionized path created by the pilot arc. The effect is that of drawing the arc outwardly between the separating members. At substantially the instant that the welding arc is extinguished, or immediately prior thereto, the stud is plunged to the surface, and the fused material at the end of the stud and on the surface coalesce to produce the desired weld.

Heretofore, it has been suggested to utilize a capacitor to store electrical energy applied thereto at relatively low power levels and to release such stored energy rapidly, at high power levels through the weld area to produce fusion thereat. As previously set forth, such heretofore known systems, however, have not been satisfactory because of their excessive size and weight, because of their excessively fluctuating input power demands, because of their being limited to a single voltage electric power source, and because of the difficulty in controlling the duration of the energy discharge therefrom. Heretofore, storage capacitor discharge rate has been retarded by means of a ballast coil or inductor connected in series with the output lines, but such heretofore known devices are quite bulky massive and heavy, and have a number of turns of heavy cable around an iron coil and require a series connection with at least one of the output lines and therefore cause substantial heat and other losses within the electrical welding apparatus.

The patentably novel electric stud welding apparatus of this invention comprises, in combination, isolating circuit means for connecting the welder with an electric power source, the isolating circuit means including transformer means for isolating said welding gun from the earth ground, said transformer means including multiple primary winding means for connecting said welder with various electric power sources, storage capacitor means for storing electric welding energy, capacitor charging circuit means for charging said storage capacitor means in a plurality of steps to limit the peak charging current to said storage capacitor means including voltage multiplying circuit means for multiplying the output voltage of said isolating circuit means, voltage sensing circuit means responsive to the voltage of said storage capacitor means and charging control circuit means responsive to said voltage sensing circuit means for selectively connecting said storage capacitor means with said isolating circuit means and said voltage multiplying circuit means, discharge control circuit means including contactor means for selectively disconnecting said storage capacitor means from said charging control circuit means and connecting said storage capacitor means with the stud and magnetic circuit means in parallel with said storage capacitor means, and output line means for connecting said discharge control means with the stud and the base.

An object of this invention is to provide a lightweight and portable electric stud welding apparatus of the capacitor discharge type wherein the storage capacitor is charged without the requirement of excessive peak input power and is chargeable from differing voltage electric power sources and is controllably discharged at a desired power level to a weld joint area without the formation of excessive heat energy at the stud, the base, and the weld joint area.

Another object of this invention is to provide a lightweight and portable electric stud welding apparatus of the storage capacitor type including isolating circuit means with transformer means having multiple primary winding means for connecting said welding apparatus with differing voltage electric power sources.

A further object of this invention is to provide a lightweight and portable electric stud welding apparatus of the storage capacitor discharge type including charging circuit means for said capacitor, said charging circuit means including voltage multiplier circuit means thereby enabling the charging rate of the capacitor to be controlled by voltage sensing circuit means responsive to the charge of said capacitor.

Still another object of this invention is to provide a lightweight and portable electric stud welding apparatus of the storage capacitor discharge type including discharge control means therefor for regulating the rate of discharge therefrom through a drawn arc to enable a proper heating rate and a proper duration of heating at the weld joint area.

Other objects and features of this invention will become readily apparent from the following detailed description which is not limiting but only descriptive of the invention.

Like numbers designate like parts.

FIGURE 3 is a graph in representative form illustrating a typical charging current-time curve of a conventional capacitor charging circuit and of the typical charging current-time curve of the storage capacitor charging circuit in the apparatus of this invention.

FIGURE 4 is a sectional view taken along line 4—4 in FIGURE 2 and also along line 4—4 in FIGURE 5.

Figure 1:
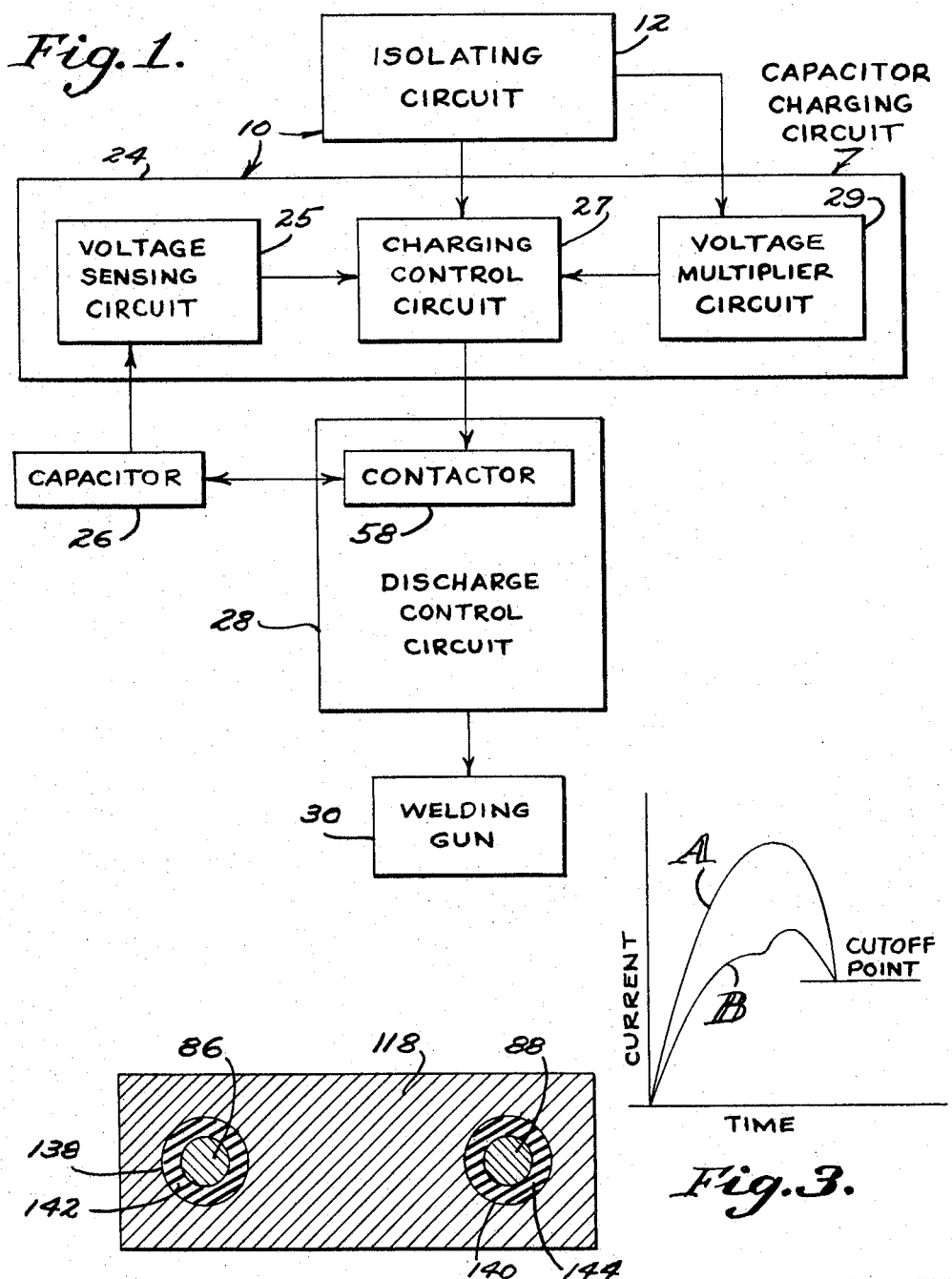
FIGURE 1 is a block diagram of the electric stud welding apparatus of this invention.

More specifically, electric welding apparatus 10, as clearly shown in the appended drawings, comprises isolating circuit 12, capacitor charging circuit 24 including voltage sensing circuit 25, charging control circuit 27 and voltage multiplier circuit 29 for charging storage capacitor 26, capacitor discharge control circuit 28 including contactor 58 and stud welding gun mechanism 30.

Figure 2:
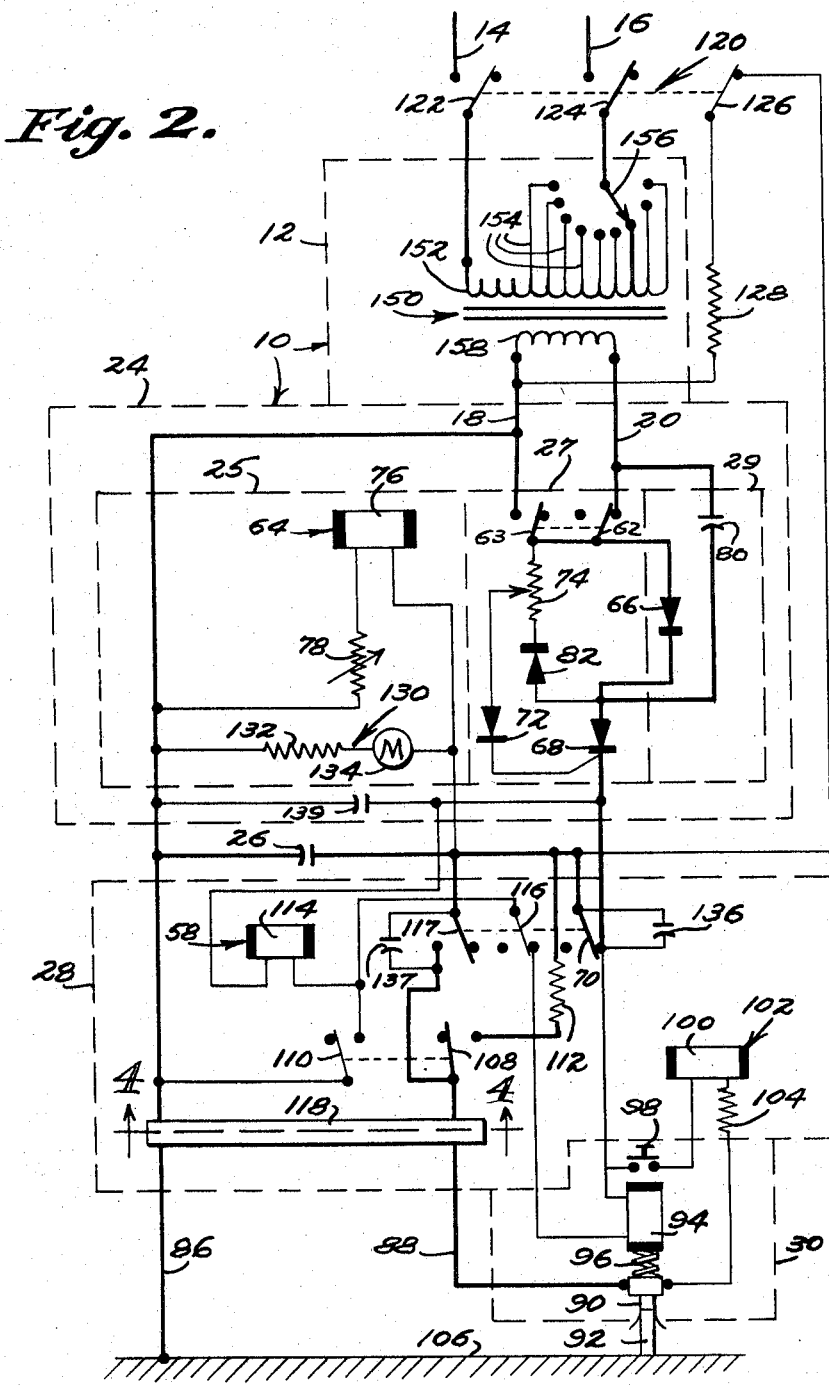
FIGURE 2 is a schematic wiring diagram of one embodiment of the electric stud welding apparatus of this invention.

Referring to FIGURE 2 of the drawing, isolating circuit 12 includes transformer 150 having primary winding means such as primary winding 152 provided with a plurality of tap connection means 154 operatively connected with selecting means, multiple contact switch means 156, for selectively connecting portions of said primary winding 152 with input wire 16. Primary winding 152 is also operatively connected with input wire 14 with the result that switch means 156 is effective to selectively connect that portion of primary winding 152 across input wires 14 and 16 to provide a desired output voltage, such as 115 volts, in secondary winding means, secondary winding 158, independent of the voltage of input wires 14 and 16 so that welding apparatus 10 can be operated from differing voltage electric power sources.

Capacitor charging circuit 24 includes voltage sensing circuit 25, charging control circuit 27, and voltage multiplier circuit 29. Capacitor charging circuit 24 charges storage capacitor 26 from secondary winding 158 to a voltage of approximately 200 volts in a plurality of distinct steps to reduce the input current requirements while charging capacitor 26 in a minimum time. Voltage sensing circuit 25 includes variable resistor 78 and operating coil 76 of relay 64. Charging control circuit 27 includes relay contacts 62 and 63, potentiometer resistor 74, diode or rectifier 82, controlled rectifier 68 and rectifier 72. Voltage doubler circuit 29 includes diode 66 and capacitor 80 which is charged during alternate half cycles and discharges in series with the voltage of secondary winding 158 during the alternate half cycles, all as clearly shown in the appended drawings. Diode 66 prevents feedback. Secondary winding 158 includes sufficient inductance for limiting the transient initial charging current of storage capacitor 26.

It is well known that the charging curve of a capacitor is essentially a high peak of current followed by a drooping curve to approximately zero, that is, when a voltage is applied to an uncharged capacitor, there is an inrush of current, the peak value of which is limited only by the applied voltage and the impedance of the circuit, as clearly shown in the appended drawings with particular reference to curve A in FIGURE 3. In the patentably novel apparatus herein disclosed said high peak is reduced. Heretofore known devices have attempted to limit the peak current by means of added impedances connected in series with the capacitor, but such added impedances increase the charge time for the capacitor and produce added inefficiencies due to heat and similar losses in the added impedance.

Since the peak charging current is also a function of the applied voltage, charging circuit 24 herein is arranged to apply a low initial charging voltage to storage capacitor 26 and to increase the charging voltage applied to storage capacitor 26 automatically when storage capacitor 26 has been charged thereby to approximately one-half of the desired full charge potential. By applying the charging potential in a plurality of increasing steps, the charging time and peak charging current are minimized together with fluctuations in the charging current. Charging circuit 24 is selectively connected with capacitor 26 through relay or contactor 58 to charge initially storage capacitor 26 directly from secondary winding 158, normally closed contact set 62 of control relay 64, diode rectifier 66, controlled rectifier 68 and normally closed contact pair 70 of contactor 58, all connected in series, and to storage capacitor 26 so that the initial charging potential applied to storage capacitor 26 is substantially the potential of secondary winding 158, which is generally approximately 110 volts. Controlled rectifier 68 is fired during the initial charging period of storage capacitor 26 by a positive voltage applied to the gate thereof through diode rectifier 72 and potentiometer resistor 74 connected with contact pair 62 of relay 64 at the junction thereof with diode rectifier 66. As storage capacitor 26 becomes charged during its initial charging period to a potential approaching the initial charging potential, that is, approaching the potential of secondary winding 158, relay 64 is automatically operated to terminate the initial charging period and to institute an increase in the charging potential applied to storage capacitor 26. Operating coil 76 of relay 64 and variable resistor 78 connected in series therewith are connected across storage capacitor 26 so that the potential applied to operating coil 76 of relay 64 is directly dependent upon and a function of the potential of storage capacitor 26. Variable resistor 78 enables the exact relationship between the operation of relay 64 and the charge on storage capacitor 26 to be varied so that the potential of storage capacitor 26 at which relay 64 will be actuated can be selected or controlled. The setting of variable resistor 78 is preferably made, or selected, so that relay 64, including operating coil 76, will be actuated when the potential of storage capacitor 26 is somewhat lower than the normal potential of secondary winding 158 with the result that the initial charging period of storage capacitor 26 will be terminated when the potential on said storage capacitor 26 is somewhat below the normal potential of secondary winding 158 and preferably slightly below, or substantially the same as, the lowest potential of secondary winding 158 to charge properly storage capacitor 26 to enable a proper weld to be effectuated thereby. If the adjustment of variable resistor 78 be selected with the foregoing criteria in view, the initial charging period will be terminated upon the decrease of the charging rate because of the decrease in the potential difference between charging potential and capacitor potential, normal potential being present at secondary winding 158 or storage capacitor 26 being charged to the maximum directly attainable from secondary winding 158. In this manner, in normal operation, the initial charging period will remain of short duration since a potential difference will always be present during the initial charging period and the initial charging period will terminate while a substantial charging current is still flowing into the capacitor 26, as clearly shown in the appended drawings, particularly FIGURES 2 and 3.

Upon operation of relay 64 in response to energization of operating coil 76 thereof by storage capacitor 26, contact set 62 of relay 64 disconnects diode rectifier 66 and potentiometer resistor 74 from connection 20 of secondary winding 158 and normally open contact set 63 connects diode rectifier 66 and potentiometer resistor 74 with connection 18 of secondary winding 158 so that when the alternating current of secondary winding 158 turns positive at connection 18 on alternate half cycles, charging capacitor 80 will be charged through rectifier 66 to the potential of secondary winding 158 and controlled rectifier 68 is rendered non-conductive to preclude discharge of capacitor 26. During the opposite half cycles, that is, when connection 18 is negative, capacitor 80 is discharged in series with secondary winding 158 resulting in a potential approximately double the potential of secondary winding 158 being applied to storage capacitor 26 through controlled rectifier 68 which is gated open by biasing developed by potentiometer resistor 74 and diode rectifier 72. Storage capacitor 26 is thusly initially charged by an initial low charging potential, and then, when storage capacitor 26 has been charged to approximately one-half of the full desired charge, the charging potential is increased to a value somewhat greater than the final charge desired to assure that the desired charge will be attained even at low input potentials. Controlled rectifier 68 is biased on its gate through diode rectifier 72, potentiometer resistor 74 and diode rectifier 82. As the voltage on storage capacitor 26 rises the negative charge of said capacitor 26 flows through potentiometer resistor 74 through the gate of controlled rectifier 68 through diode rectifier 72. More negative bias is applied to the gate of controlled rectifier 68 as the arm of potentiometer resistor 74 moves away from diode rectifier 82, and controlled rectifier 68 is cut off at a lower voltage on storage capacitor 26.

Referring to FIGURE 3 of the appended drawings, curve A is a graph of a normal charging current versus time for charging said capacitor 26 directly from a 230 volt source starting with capacitor 26 in its fully discharged state, and curve B is a graph of charging current versus time for charging said capacitor 26 in the plurality of steps as in the apparatus of this invention. It is readily apparent that the charging current required by the apparatus herein is only about one-half that required by heretofore known apparatus and that the charging time remains substantially the same.

After capacitor 26 has been charged to the operating potential thereof, as hereinbefore pointed out, controlled rectifier 68 stops conducting, thereby disconnecting capacitor 26 from secondary winding 158, but, if the charge on capacitor 26 should leak off or be otherwise dissipated, controlled rectifier bias will be reduced and capacitor 26 will be automatically retained at its full operating charge.

Since relay 64 preferably operates at a potential less than the normal voltage of secondary winding 158 and controlled rectifier 68 preferably cuts off at a potential less than the normal combined potentials of secondary winding 158 and capacitor 80 so that the operating potential of capacitor 26 is less than the potential normally available for charging capacitor 26 and controlled rectifier 68 prevents charging capacitor 26 to an excessive potential, it is readily apparent that the input potential applied to primary windings 152 is not critical and capacitor 26 will be charged to the desired potential for a fairly wide range of line potentials applied to primary windings 152 of transformer 150 enabling the novel stud welding apparatus of this invention to be powered from a substantially continuous wide range of available voltages with a minimum number of tap connections 154 and lessening the likelihood of poor welds if the available supply voltage does not correspond exactly to a standard supply potential.

Capacitor discharge control circuit 28 includes contactor 58, limiting resistor 112, relay 102 including coil 100 and normally open contact sets 108 and 110, resistor 104, trigger switch 98 structurally associated with welding gun 30, magnetic circuit 118, negative output bus wire 86 and positive output bus wire 88. When contactor 58, including operating coil 114, normally open contacts 117, normally closed auxiliary contacts 116, and normally closed auxiliary contacts 70, is actuated, contacts 70 open thereby disconnecting storage capacitor 26 from charging circuit 24.

Stud welding gun 30 comprises chuck 90 for gripping and retaining stud 92 and electrically connecting stud 92 with positive output bus wire 88 of welding apparatus 10. Chuck 90 is operatively associated with motor means such as solenoid coil 94 which is so constructed and arranged that energization of solenoid coil 94 draws chuck 90 and attached stud 92 towards solenoid coil 94. Biasing means such as spring 96 is provided between solenoid coil 94 and chuck 90 to bias said chuck 90 outwardly of solenoid coil 94 enabling solenoid coil 94 to draw chuck 90 and stud 92 inwardly when solenoid coil 94 is energized, and spring 96 pushes chuck 90 and stud 92 outwardly when solenoid coil 94 is not energized. Normally open trigger, or push button type, switch 98 is also provided structurally associated with welding gun 30 to enable operation of capacitor discharge control circuit 28 by an operator by means of welding gun 30.

Trigger switch 98 is connected in series between the output side of controlled rectifier 68 and one side of operating coil 100 of relay 102. The other side of operating coil 100 of relay 102 is connected, through series resistor 104, to chuck 90 of welding gun 30 so that relay 102 is operated only when trigger switch 98 is closed and stud 92 is in contact with work surface 106 and work surface 106 is connected with negative output bus wire 86. Series resistor 104 is preferably of a sufficiently high resistance as to preclude dangerous shock potentials from being present between welding gun 30 and work surface 106 at all times except when storage capacitor 26 is discharged therebetween, thereby to provide an additional safety feature in the apparatus of this invention.

Relay 102 comprises two normally open contact pairs 108 and 110, contact set or pair 108 being connected in series with pilot current limiting resistor 112 connected to the positive side of capacitor 26 and positive output bus wire 88 so that capacitor 26 is initially discharged through limiting resistor 112 upon actuation of relay 102.

Contact set or pair 110 of relay 102 is connected in series with the negative side of capacitor 26 and one side of operating coil 114 of contactor 58, the other side of operating coil 114 being connected with the output of controlled rectifier 68, contact set or pair 110 also being connected with normally closed contact set or pair 116. Solenoid coil 94 of gun 30 is in turn connected with normally closed contact set or pair 116 and with the output of controlled rectifier 68 so that, upon actuation of relay 102, contact set or pair 110 will be actuated to energize operating coil 114 of contactor 58 and solenoid coil 94 of welding gun 30. Upon actuation of contactor 58, normally closed contact set or pair 116 thereof is opened, de-energizing solenoid coil 94 of welding gun 30. Output bus wire 88 is also connected to normally open contact set or pair 117 of contactor 58 so that actuation of contactor 58 will connect storage capacitor 26 directly with chuck 90 of welding gun 30.

With stud 92 properly engaged in chuck 90 and with stud 92 in contact with work surface 106, if switch 98 is closed, operating coil 100 of relay 102 is energized through switch 98, resistor 104, chuck 90, stud 92, work surface 106, and negative output bus wire 86, thereby closing contact sets or pairs 108 and 110 of relay 102. The closing operation of contact set or pair 108 initiates a pilot current through limiting resistor 112 from storage capacitor 26 causing said pilot current to flow between stud 92 and work surface 106. The concurrent closing of contact set or pair 110 initiates a flow of current from secondary winding 158 through operating coil 114 of contactor 58 and contact set or pair 116 and solenoid coil 94 connected therewith. Said current flow through solenoid coil 94 of welding gun 30 causes chuck 90 and attached stud 92 to be attracted towards solenoid coil 94 against the biasing of spring 96, and stud 92 is raised above work surface 106, and a pilot arc is drawn between stud 92 and work surface 106 forming an ionized path therebetween. As contactor 58 operates, due to energization of operating coil 114 thereof through contact set or pair 110, contact set or pair 116 opens, de-energizing solenoid coil 94. At substantially the same time, contact set or pair 117 closes the direct connection between storage capacitor 26 and chuck 90 of welding gun 30 enabling full welding power to flow across the ionized path existing between stud 92 and work surface 106 to melt the end portion of stud 92 and a portion of work surface 106 adjacent and opposite stud 92.

Shortly thereafter, spring 96 returns stud 92 into contact with work surface 106 enabling the molten end portion of stud 92 and the molten portion of work surface 106 to coalesce, or fuse, and complete the weld joint.

Since the discharge of storage capacitor 26 when directly connected with stud 92 and work surface 106 would be extremely short in time duration and is extremely high in current intensity, there is specifically included in capacitor discharge control circuit 28 means for limiting the peak discharge current and extending the duration of the arc, thereby to prevent excessive heating of stud 92 and work surface 106. The rapid discharge normally occurring upon direct connection of storage capacitor 26 with stud 92 and work surface 106 results in poor quality welds accompanied by a tendency of stud 92 to break off at work surface 106 because of strains resulting, amoung other causes, from low environmental temperatures and rapid quenching of the weld joint. Such rapid heating of the weld joint area, without any substantial heating of the areas surrounding the weld joint results in an extremely hard, brittle weld joint due to rapid quenching of the weld joint. If, however, the discharge rate is reduced, then such rapid cooling of the weld joint is prevented and a ductile and reliable weld joint results.

The patentably novel electric welding apparatus 10 includes a magnetic circuit including iron bar 118 positioned adjacent and around each of output bus wires 86 and 88 for slowing down or retarding the discharge of storage capacitor 26 by causing the discharge current to magnetize the mass of iron bar 118. While separate iron masses can be utilized around each of wires 86 and 88, single iron bar 118 is preferably used, said iron bar 118 having openings 138 and 140 therein and therethrough for receiving and holding in place output bus wires 86 and 88, respectively. Output bus wires 86 and 88, as clearly shown in FIGURE 4 of the appended drawings, of course include insulation 142 and 144, respectively.

Furthermore, since iron bar 118 is in parallel with storage capacitor 26 and output bus wires 86 and 88 and since no splitting of output bus wires 86 and 88 or any extra length of bus wire is required in the form of an inductor coil, savings in weight are accomplished accompanied by less heating and other inefficiencies of the heretofore known devices because of the increased length of high current carrying output bus wires.

Line power switch 120 having two normally open contact sets or pairs 122 and 124 may be provided for controlling the input power to transformer 150. As an additional safety device, normally closed contact set or pair 126 may be ganged with normally open contact sets or pairs 122 and 124 for actuation by common actuating means therewith and connected with series discharge resistor 128, contact set or pair 126 and series discharge resistor 128 being in parallel with storage capacitor 26 so that when line power switch 120 is turned off, contact sets or pairs 122 and 124 are opened to interrupt charging current to storage capacitor 26 and contact set or pair 126 is simultaneously closed to connect discharge resistor 128 directly across storage capacitor 26 to discharge it and thereby preclude shock hazards therefrom.

Also, voltmeter 130 comprising resistor 132 and meter movement 134 may be connected across storage capacitor 26 to determine the state of charge thereof and capacitors 136 and 137 may be connected across contact sets or pairs 70 and 117, respectively, of contactor 58 to reduce arcing thereacross.

To decrease further the initial peak charging current to storage capacitor 26, capacitor 139 may be connected across the output of charging circuit 24 so that when storage capacitor 26 has been fully discharged, capacitor 139 will partially discharge into storage capacitor 26 at the start of the initial charging period and thereby effectively preclude presentation of a fully discharged storage capacitor 26 across the input for any substantial time interval.

Figure 5:
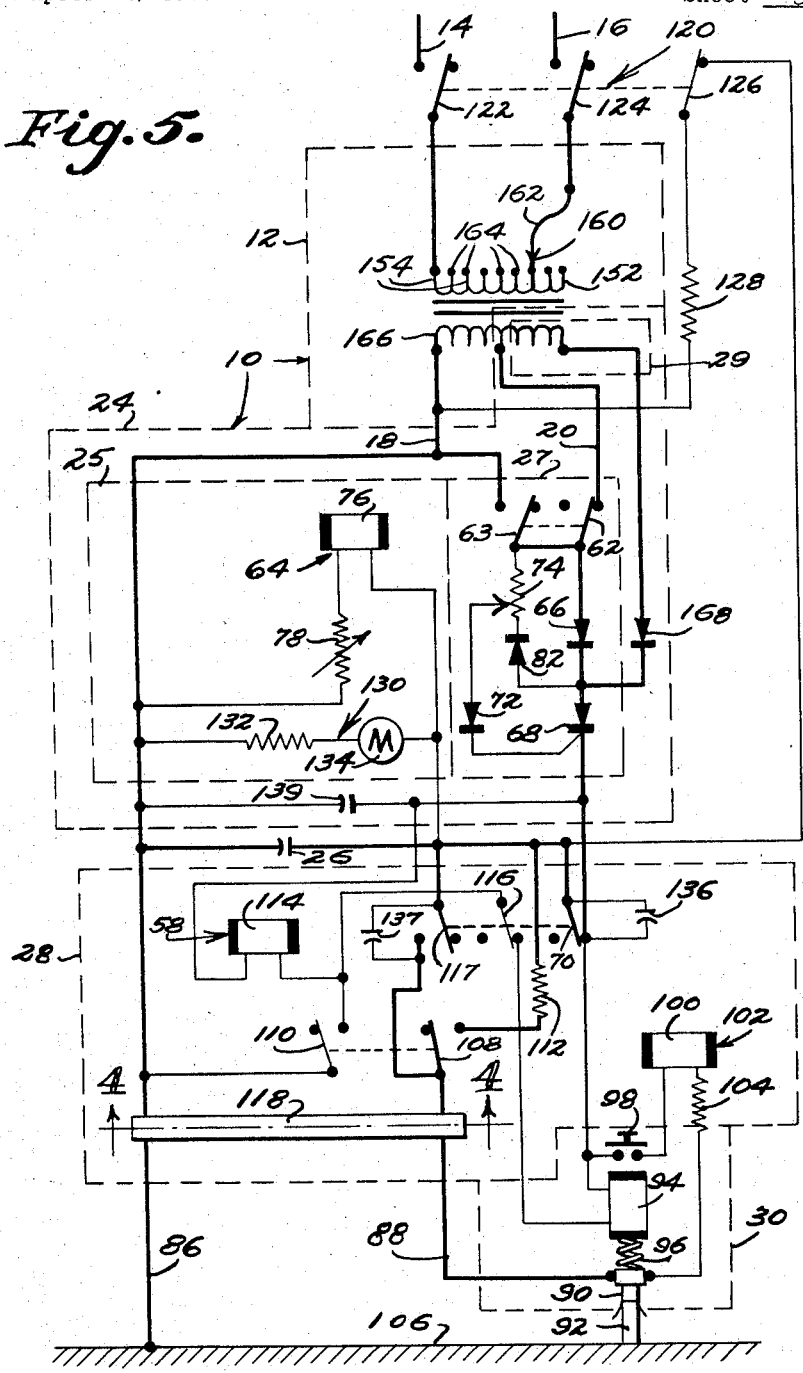
FIGURE 5 is a schematic wiring diagram of another embodiment of the electric stud welding apparatus of this invention.

As clearly shown in FIGURE 5 of the appended drawings, switch means 156 can, of course, be replaced by plug 160 connected with flexible wire 162 for connection with any of tap connections 154 by jacks 164 connected with tap connections 154 for selecting the desired portion of primary winding 152 corresponding to the supply potential available.

Furthermore, as also clearly shown in FIGURE 5 of the appended drawings, multiple secondary winding means, such as tapped secondary winding 166 can, of course, be substituted for secondary winding 158 and capacitor 80 so that during the initial charging period only one-half of tapped secondary winding 166 will be connected with storage capacitor 26 by normally closed contacts 62 of relay 64 and during the final charging period the entire tapped secondary winding 166 will be connected with storage capacitor 26. Diode rectifier 168 is, of course, provided to prevent shorting of the winding portion of tapped secondary winding 166 not utilized during the initial charging period. In all other respects, the operation of the apparatus of FIGURE 5 is identical with the operation of the apparatus clearly shown in FIGURE 2 and hereinbefore described in detail.

Preferred embodiments of this invention have been hereinbefore described, but many variations thereof will be readily apparent to those skilled in the art without departing from the spirit thereof. Therefore, it is intended that the foregoing shell be considered illustrative only and not construed in a limiting sense, the present invention being defined solely by the claims granted to me.

I claim:

1. A lightweight and portable electric welder adapted for use with various electric power sources to weld a conductive element held in a welding gun to a second conductive element comprising, in combination, (1) isolating circuit means for connecting said welder with an electric power source, said isolating circuit means including transformer means for isolating said welding gun from the earth ground of said source, said transformer means including multiple primary winding means for connecting said welder with various electric power sources, (2) storage capacitor means for storing electric welding energy, (3) capacitor charging circuit means for charging said storage capacitor means, said capacitor charging circuit means being connected with said isolating circuit means and said storage capacitor means, said capacitor charging circuit means comprising (i) voltage multiplier circuit means connected with said isolating circuit means for multiplying the output voltage of said isolating circuit means, (ii) voltage sensing circuit means operatively connected with said storage capacitor means for sensing the voltage stored on said storage capacitor means and (iii) charging control circuit means responsive to said voltage sensing circuit means for selectively connecting said storage capacitor means with said isolating circuit means and said voltage multiplier circuit means, whereby said storage capacitor is charged in a plurality of steps, thereby limiting the peak input current to said storage capacitor means, (4) discharge control circuit means for enabling said storage capacitor means to be controllably discharged through said conductive elements, said discharge control circuit means comprising (i) contactor means for selectively disconnecting said storage capacitor means from said charging control circuit means and connecting said storage capacitor means with said conductive elements and (ii) magnetic circuit means for controlling the rate of discharge of said storage capacitor means, said magnetic circuit means being in parallel with said storage capacitor means, and (5) output line means for connecting said discharge control means with said conductive elements.

2. The electric welder of claim 1 wherein said transformer multiple primary winding means comprises a single primary winding having a plurality of tap connection means for selectively connecting portions of said primary winding with said electric power source.

3. The electric welder of claim 1 wherein said transformer multiple primary winding means includes a plurality of primary winding portions and said isolating circuit means also includes selecting means for selectively connecting said primary winding portions with said electric power source.

4. The electric welder of claim 3 wherein said selecting means comprises multiple contact switch means for switching said electric power source between connections with said primary winding portions, said multiple contact switch means being connected with said primary winding portions.

5. The electric welder of claim 3 wherein said selecting means comprises jack and plug means for connecting said primary winding portions with said electric power source, one of said jack and plug means being connected with said primary winding portions and the other of said jack and plug means being adapted for connection with said electric power source.

6. The electric welder of claim 1 wherein said capacitor charging circuit means includes said rectifier means for rectifying current flow therethrough, said rectifier means being connected in series with said storage capacitor means and, said voltage multiplier circuit means includes voltage doubler circuit means for substantially doubling the voltage of said isolating circuit means, said charging control circuit means initially connecting said storage capacitor means with said isolating circuit means when the voltage of said storage capacitor means is substantially less than the voltage of said isolating circuit means and connecting said voltage doubler circuit means between said isolating circuit means and said storage capacitor means when the voltage of said storage capacitor means approaches the voltage of said isolating circuit means, whereby said storage capacitor means is charged to substantially double the voltage of said isolating circuit means.

7. The electric welder of claim 6 wherein said isolating circuit means includes first transformer secondary winding means for producing a first voltage when said primary winding means is energized and said voltage doubler circuit means includes second transformer secondary winding means for producing a second voltage when said primary winding means is energized, said second transformer secondary winding means being connected in series with said first transformer secondary winding means.

8. The electric welder of claim 7 wherein said first and second transformer secondary winding means comprises a single secondary winding including tap connection means for connecting portions of said secondary winding with said charging control circuit means, said tap connection means being connected with said charging control circuit means.

9. The electric welder of claim 6 wherein said voltage doubler circuit means includes voltage doubling capacitor means connected between said isolating circuit means and said rectifier means for discharging in series with said isolating circuit means on alternate half cycles and further rectifier means connected with said isolating circuit means and said voltage doubling capacitor means for enabling said voltage doubling capacitor means to be charged from said isolating circuit means on the other alternate half cycles and for precluding discharge of said voltage doubling capacitor means into said isolating circuit means during said alternate half cycles, whereby said voltage doubling capacitor means is changed by said isolating circuit means and is discharged in series therewith on alternate half cycles thereof.

10. The electric welder of claim 6 wherein said charging control circuit means includes relay contact means for connecting said voltage doubler circuit means between said isolating circuit means and said storage capacitor means and said voltage sensing circuit means includes operating coil means for actuating said relay contact means and variable resistor means for varying the voltage of said storage capacitor means at which said voltage doubler circuit means will be connected between said isolating circuit means and said storage capacitor means, said variable resistor means and said operating coil means being connected in series across said storage capacitor means to enable a voltage of said storage capacitor means selected by said variable resistor means to actuate said relay contact means.

11. The electric welder of claim 6 wherein said rectifier means includes controlled rectifier means for enabling the charging of said storage capacitor means to be terminated at a selected voltage lower than the output voltage of said voltage doubler circuit means and for enabling said storage capacitor means to be maintained at said selected voltage and said charging control circuit means also includes potentiometer resistance means for varying said selected voltage and additional rectifier means connected in series between the arm of said potentiometer resistance means and the gate of said controlled rectifier means for precluding improper polarity biasing from being applied to said gate.

12. The electric welder of claim 1 wherein said contactor means includes an operating coil and a plurality of contacts and said discharge control circuit means includes manually operable switch means structurally associated with said welding gun for initiating discharge of said storage capacitor means, discharge limiting resistor means for limiting the discharge current of said storage capacitor means to a pilot arc current value, one termination of said limiting resistor means being connected with said storage capacitor means and relay means responsive to said manually operable switch means for controllably connecting the other termination of said limiting resistor means with said welding gun conductive element, said relay means being also operatively associated with the operating coil of said contactor means whereby said operating coil is energized upon operation of said relay means, and said output line means includes output bus wire means connected with said welding gun and a contact of said contactor means for direct connection of said one conductive element with said storage capacitor means upon operation of said contactor means and for connecting the other of said conductive elements with said storage capacitor means, whereby an initial pilot discharge of said storage capacitor means controlled by said limiting resistor means occurs through said conductive elements in response to actuation of said switch means followed sequentially by a full discharge of said storage capacitor means through said conductive elements to provide a weld therebetween.

13. The electric welder of claim 12 also including motor means operatively associated with said contactor means for causing a separation of said conductive elements during the occurrence of said pilot discharge.

14. The electric welder of claim 13 wherein said motor means includes a solenoid coil connected in parallel with the operating coil of said contactor means and in series with a normally closed contact pair of said contactor means whereby operation of said relay means energizes said solenoid for separating said conductive elements and full operation of said contactor means de-energizes said solenoid coil.

15. The electric welder of claim 14 wherein the operating means of said relay means is connected in series with said conductive elements to permit operation of said relay means only when said conductive elements are in contact together with spring means for biasing said conductive elements into contact.

16. The electric welder of claim 1 also including magnetic circuit means magnetically associated in parallel with and electrically insulated from said output line means whereby the rate of discharge of said storage capacitor means is controlled.

17. The electric welder of claim 16 wherein said magnetic circuit means comprises an iron bar having apertures for enabling the passage therethrough of said output line means.

18. The electric welder of claim 1 also including manual switching means operably associated with said electric power source for disconnecting said electric power source from said isolating circuit means and discharge resistor means for discharging said storage capacitor means, said manual switching means being operably associated with said discharge resistor means and said storage capacitor means for establishing a connection therebetween when disconnecting said electric power source, whereby a controlled discharge of said storage capacitor means occurs upon disconnection of said electric power source.

References Cited

UNITED STATES PATENTS

| 3,035,219 | 5/1962 | Friedman | 320—1 |
| 3,291,958 | 12/1966 | Glorioso | 219—98 |
| 3,319,039 | 5/1967 | Glorioso | 219—113 X |

RICHARD M. WOOD, *Primary Examiner.*

CHARLES M. CHADD, *Assistant Examiner.*

U.S. Cl. X.R.

219—113; 320—1